United States Patent
Wang et al.

(10) Patent No.: US 9,702,993 B2
(45) Date of Patent: Jul. 11, 2017

(54) MULTI-PARAMETER INVERSION THROUGH OFFSET DEPENDENT ELASTIC FWI

(71) Applicants: Ke Wang, Sugar Land, TX (US); Spyridon Lazaratos, Houston, TX (US)

(72) Inventors: Ke Wang, Sugar Land, TX (US); Spyridon Lazaratos, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 535 days.

(21) Appl. No.: 14/272,020

(22) Filed: May 7, 2014

(65) Prior Publication Data

US 2014/0350861 A1    Nov. 27, 2014

Related U.S. Application Data

(60) Provisional application No. 61/827,474, filed on May 24, 2013.

(51) Int. Cl.
  *G01V 1/28* (2006.01)
  *G01V 1/30* (2006.01)
(52) U.S. Cl.
  CPC .......... *G01V 1/28* (2013.01); *G01V 1/303* (2013.01); *G01V 1/306* (2013.01); *G01V 2210/622* (2013.01); *G01V 2210/673* (2013.01)
(58) Field of Classification Search
  CPC . G01V 11/00; G01V 1/30; G01V 1/00; G01V 1/50; G06T 11/006; G06F 17/5009; G06F 2217/16
  See application file for complete search history.

(56) References Cited

U.S. PATENT DOCUMENTS 3,812,457 A    5/1974    Weller
3,864,667 A    2/1975    Bahjat
(Continued)

FOREIGN PATENT DOCUMENTS

CA    2 796 631    11/2011
EP    1 094 338    4/2001
(Continued)

OTHER PUBLICATIONS

Smith, G.C. et al., "Weighted Stacking for Rock Property Estimation and Detection of Gas," *Geophysical Prospecting* 35(9), pp. 993-1014, 1987.
(Continued)

*Primary Examiner* — Elias Desta
(74) *Attorney, Agent, or Firm* — ExxonMobil Upstream Research-Law Department (57) ABSTRACT

Method for multi-parameter inversion using elastic inversion. This method decomposes data into offset/angle groups and performs inversion on them in sequential order. This method can significantly speed up convergence of the iterative inversion process, and is therefore most advantageous when used for full waveform inversion (FWI). The present inventive approach draws upon relationships between reflection energy and reflection angle, or equivalently, offset dependence in elastic FWI. The invention uses recognition that the amplitudes of small angle (near offset) reflections are largely determined by acoustic impedance alone (1), independent for the most part of Vp/Vs. Large angle (middle and far offset) reflections are affected by Ip, Vp/Vs (2) and other earth parameters such as density (3) and anisotropy. Therefore, the present inventive method decomposes data into angle or offset groups in performing multi-parameter FWI to reduce crosstalk between the different model parameters being determined in the inversion.

11 Claims, 6 Drawing Sheets

(56) References Cited

U.S. PATENT DOCUMENTS

| | | |
|---|---|---|
| 4,159,463 A | 6/1979 | Silverman |
| 4,168,485 A | 9/1979 | Payton et al. |
| 4,545,039 A | 10/1985 | Savit |
| 4,562,540 A | 12/1985 | Devaney |
| 4,575,830 A | 3/1986 | Ingram et al. |
| 4,594,662 A | 6/1986 | Devaney |
| 4,636,956 A | 1/1987 | Vannier et al. |
| 4,675,851 A | 6/1987 | Savit et al. |
| 4,686,654 A | 8/1987 | Savit |
| 4,707,812 A | 11/1987 | Martinez |
| 4,715,020 A | 12/1987 | Landrum, Jr. |
| 4,766,574 A | 8/1988 | Whitmore et al. |
| 4,780,856 A | 10/1988 | Becquey |
| 4,823,326 A | 4/1989 | Ward |
| 4,924,390 A | 5/1990 | Parsons et al. |
| 4,953,657 A | 9/1990 | Edington |
| 4,969,129 A | 11/1990 | Currie |
| 4,982,374 A | 1/1991 | Edington et al. |
| 5,260,911 A | 11/1993 | Mason et al. |
| 5,469,062 A | 11/1995 | Meyer, Jr. |
| 5,583,825 A | 12/1996 | Carrazzone et al. |
| 5,677,893 A | 10/1997 | de Hoop et al. |
| 5,715,213 A | 2/1998 | Allen |
| 5,717,655 A | 2/1998 | Beasley |
| 5,719,821 A | 2/1998 | Sallas et al. |
| 5,721,710 A | 2/1998 | Sallas et al. |
| 5,790,473 A | 8/1998 | Allen |
| 5,798,982 A | 8/1998 | He et al. |
| 5,822,269 A | 10/1998 | Allen |
| 5,838,634 A | 11/1998 | Jones et al. |
| 5,852,588 A | 12/1998 | de Hoop et al. |
| 5,878,372 A | 3/1999 | Tabarovsky et al. |
| 5,920,828 A | 7/1999 | Norris et al. |
| 5,924,049 A | 7/1999 | Beasley et al. |
| 5,999,488 A | 12/1999 | Smith |
| 5,999,489 A | 12/1999 | Lazaratos |
| 6,005,916 A | 12/1999 | Johnson et al. |
| 6,014,342 A | 1/2000 | Lazaratos |
| 6,021,094 A | 2/2000 | Ober et al. |
| 6,028,818 A | 2/2000 | Jeffryes |
| 6,058,073 A | 5/2000 | VerWest |
| 6,125,330 A | 9/2000 | Robertson et al. |
| 6,219,621 B1 | 4/2001 | Hornbostel |
| 6,225,803 B1 | 5/2001 | Chen |
| 6,311,133 B1 | 10/2001 | Lailly et al. |
| 6,317,695 B1 | 11/2001 | Zhou et al. |
| 6,327,537 B1 | 12/2001 | Ikelle |
| 6,374,201 B1 | 4/2002 | Grizon et al. |
| 6,381,543 B1 | 4/2002 | Guerillot et al. |
| 6,388,947 B1 | 5/2002 | Washbourne et al. |
| 6,480,790 B1 | 11/2002 | Calvert et al. |
| 6,522,973 B1 | 2/2003 | Tonellot et al. |
| 6,545,944 B2 | 4/2003 | de Kok |
| 6,549,854 B1 | 4/2003 | Malinverno et al. |
| 6,574,564 B2 | 6/2003 | Lailly et al. |
| 6,593,746 B2 | 7/2003 | Stolarczyk |
| 6,662,147 B1 | 12/2003 | Fournier et al. |
| 6,665,615 B2 | 12/2003 | Van Riel et al. |
| 6,687,619 B2 | 2/2004 | Moerig et al. |
| 6,687,659 B1 | 2/2004 | Shen |
| 6,704,245 B2 | 3/2004 | Becquey |
| 6,714,867 B2 | 3/2004 | Meunier |
| 6,735,527 B1 | 5/2004 | Levin |
| 6,754,590 B1 | 6/2004 | Moldoveanu |
| 6,766,256 B2 | 7/2004 | Jeffryes |
| 6,826,486 B1 | 11/2004 | Malinverno |
| 6,836,448 B2 | 12/2004 | Robertsson et al. |
| 6,842,701 B2 | 1/2005 | Moerig et al. |
| 6,859,734 B2 | 2/2005 | Bednar |
| 6,865,487 B2 | 3/2005 | Charron |
| 6,865,488 B2 | 3/2005 | Moerig et al. |
| 6,876,928 B2 | 4/2005 | Van Riel et al. |
| 6,882,938 B2 | 4/2005 | Vaage et al. |
| 6,882,958 B2 | 4/2005 | Schmidt et al. |
| 6,901,333 B2 | 5/2005 | Van Riel et al. |
| 6,903,999 B2 | 6/2005 | Curtis et al. |
| 6,906,981 B2 | 6/2005 | Vauge |
| 6,927,698 B2 | 8/2005 | Stolarczyk |
| 6,944,546 B2 | 9/2005 | Xiao et al. |
| 6,947,843 B2 | 9/2005 | Fisher et al. |
| 6,970,397 B2 | 11/2005 | Castagna et al. |
| 6,977,866 B2 | 12/2005 | Huffman et al. |
| 6,999,880 B2 | 2/2006 | Lee |
| 7,046,581 B2 | 5/2006 | Calvert |
| 7,050,356 B2 | 5/2006 | Jeffryes |
| 7,069,149 B2 | 6/2006 | Goff et al. |
| 7,072,767 B2 | 7/2006 | Routh et al. |
| 7,092,823 B2 | 8/2006 | Lailly et al. |
| 7,110,900 B2 | 9/2006 | Adler et al. |
| 7,184,367 B2 | 2/2007 | Yin |
| 7,230,879 B2 | 6/2007 | Herkenhoff et al. |
| 7,271,747 B2 | 9/2007 | Baraniuk et al. |
| 7,330,799 B2 | 2/2008 | Lefebvre et al. |
| 7,337,069 B2 | 2/2008 | Masson et al. |
| 7,373,251 B2 | 5/2008 | Hamman et al. |
| 7,373,252 B2 | 5/2008 | Sherrill et al. |
| 7,376,046 B2 | 5/2008 | Jeffryes |
| 7,376,539 B2 | 5/2008 | Lecomte |
| 7,400,978 B2 | 7/2008 | Langlais et al. |
| 7,436,734 B2 | 10/2008 | Krohn |
| 7,480,206 B2 | 1/2009 | Hill |
| 7,584,056 B2 | 9/2009 | Koren |
| 7,599,798 B2 | 10/2009 | Beasley et al. |
| 7,602,670 B2 | 10/2009 | Jeffryes |
| 7,616,523 B1 | 11/2009 | Tabti et al. |
| 7,620,534 B2 | 11/2009 | Pita et al. |
| 7,620,536 B2 | 11/2009 | Chow |
| 7,646,924 B2 | 1/2010 | Donoho |
| 7,672,194 B2 | 3/2010 | Jeffryes |
| 7,672,824 B2 | 3/2010 | Dutta et al. |
| 7,675,815 B2 | 3/2010 | Saenger et al. |
| 7,679,990 B2 | 3/2010 | Herkenhoff et al. |
| 7,684,281 B2 | 3/2010 | Vaage et al. |
| 7,710,821 B2 | 5/2010 | Robertsson et al. |
| 7,715,985 B2 | 5/2010 | Van Manen et al. |
| 7,715,986 B2 | 5/2010 | Nemeth et al. |
| 7,725,266 B2 | 5/2010 | Sirgue et al. |
| 7,791,980 B2 | 9/2010 | Robertsson et al. |
| 7,835,072 B2 | 11/2010 | Izumi |
| 7,840,625 B2 | 11/2010 | Candes et al. |
| 7,940,601 B2 | 5/2011 | Ghosh |
| 8,121,823 B2 | 2/2012 | Krebs et al. |
| 8,248,886 B2 | 8/2012 | Neelamani et al. |
| 8,379,482 B1 * | 2/2013 | Khare ............... G01V 1/28 367/73 |
| 8,428,925 B2 | 4/2013 | Krebs et al. |
| 8,437,998 B2 | 5/2013 | Routh et al. |
| 8,547,794 B2 | 10/2013 | Gulati et al. |
| 8,688,381 B2 | 4/2014 | Routh et al. |
| 8,781,748 B2 | 7/2014 | Loddoch et al. |
| 2002/0099504 A1 | 7/2002 | Cross et al. |
| 2002/0120429 A1 | 8/2002 | Ortoleva |
| 2002/0169559 A1 | 11/2002 | Onyia et al. |
| 2002/0183980 A1 | 12/2002 | Guillaume |
| 2004/0199330 A1 | 10/2004 | Routh et al. |
| 2004/0220743 A1 | 11/2004 | Sahai et al. |
| 2004/0225483 A1 | 11/2004 | Okoniewski et al. |
| 2004/0243313 A1 | 12/2004 | Broto |
| 2006/0235666 A1 | 10/2006 | Assa et al. |
| 2007/0036030 A1 | 2/2007 | Baumel et al. |
| 2007/0038691 A1 | 2/2007 | Candes et al. |
| 2007/0274155 A1 | 11/2007 | Ikelle |
| 2008/0175101 A1 | 7/2008 | Saenger et al. |
| 2008/0306692 A1 | 12/2008 | Singer et al. |
| 2009/0067041 A1 | 3/2009 | Izumi |
| 2009/0070042 A1 | 3/2009 | Birchwood et al. |
| 2009/0083006 A1 | 3/2009 | Mackie |
| 2009/0164186 A1 | 6/2009 | Haase et al. |
| 2009/0164756 A1 | 6/2009 | Dokken et al. |
| 2009/0187391 A1 | 7/2009 | Wendt et al. |
| 2009/0248308 A1 | 10/2009 | Luling |
| 2009/0254320 A1 | 10/2009 | Lovatini et al. |
| 2009/0259406 A1 | 10/2009 | Khadhraoui et al. |
| 2009/0271118 A1 | 10/2009 | Saltzer et al. |

(56) References Cited

U.S. PATENT DOCUMENTS

| | | |
|---|---|---|
| 2010/0008184 A1 | 1/2010 | Hegna et al. |
| 2010/0018718 A1 | 1/2010 | Krebs et al. |
| 2010/0039894 A1 | 2/2010 | Abma et al. |
| 2010/0054082 A1 | 3/2010 | McGarry et al. |
| 2010/0088035 A1 | 4/2010 | Etgen et al. |
| 2010/0103772 A1 | 4/2010 | Eick et al. |
| 2010/0118651 A1 | 5/2010 | Liu et al. |
| 2010/0142316 A1 | 6/2010 | Keers et al. |
| 2010/0161233 A1 | 6/2010 | Saenger et al. |
| 2010/0161234 A1 | 6/2010 | Saenger et al. |
| 2010/0177595 A1 | 7/2010 | Khare et al. |
| 2010/0185422 A1 | 7/2010 | Hoversten |
| 2010/0208554 A1* | 8/2010 | Chiu et al. |
| 2010/0212909 A1 | 8/2010 | Baumstein et al. |
| 2010/0246324 A1 | 9/2010 | Dragoset, Jr. et al. |
| 2010/0265797 A1 | 10/2010 | Robertsson et al. |
| 2010/0270026 A1 | 10/2010 | Lazaratos et al. |
| 2010/0286919 A1 | 11/2010 | Lee et al. |
| 2010/0299070 A1 | 11/2010 | Abma |
| 2011/0000678 A1 | 1/2011 | Krebs et al. |
| 2011/0040926 A1 | 2/2011 | Donderiei et al. |
| 2011/0051553 A1 | 3/2011 | Scott et al. |
| 2011/0090760 A1 | 4/2011 | Rickett et al. |
| 2011/0131020 A1 | 6/2011 | Meng |
| 2011/0134722 A1 | 6/2011 | Virgilio et al. |
| 2011/0182141 A1 | 7/2011 | Zhamikov et al. |
| 2011/0182144 A1 | 7/2011 | Gray |
| 2011/0191032 A1 | 8/2011 | Moore |
| 2011/0194379 A1 | 8/2011 | Lee et al. |
| 2011/0222370 A1 | 9/2011 | Downton et al. |
| 2011/0227577 A1 | 9/2011 | Zhang et al. |
| 2011/0235464 A1 | 9/2011 | Brittan et al. |
| 2011/0238390 A1 | 9/2011 | Krebs et al. |
| 2011/0246140 A1 | 10/2011 | Abubakar et al. |
| 2011/0267921 A1 | 11/2011 | Mortel et al. |
| 2011/0267923 A1 | 11/2011 | Shin |
| 2011/0276320 A1 | 11/2011 | Krebs et al. |
| 2011/0288831 A1 | 11/2011 | Tan et al. |
| 2011/0299361 A1 | 12/2011 | Shin |
| 2011/0320180 A1 | 12/2011 | Al-Saleh |
| 2012/0010862 A1 | 1/2012 | Costen |
| 2012/0014215 A1 | 1/2012 | Saenger et al. |
| 2012/0014216 A1 | 1/2012 | Saenger et al. |
| 2012/0051176 A1 | 3/2012 | Liu |
| 2012/0051177 A1* | 3/2012 | Hardage ............... G01V 1/286 367/43 |
| 2012/0073824 A1 | 3/2012 | Routh |
| 2012/0073825 A1 | 3/2012 | Routh |
| 2012/0082344 A1 | 4/2012 | Donoho |
| 2012/0143506 A1 | 6/2012 | Routh et al. |
| 2012/0215506 A1 | 8/2012 | Rickett et al. |
| 2012/0218859 A1 | 8/2012 | Soubaras |
| 2012/0275264 A1 | 11/2012 | Kostov et al. |
| 2012/0275267 A1 | 11/2012 | Neelamani et al. |
| 2012/0290214 A1 | 11/2012 | Huo et al. |
| 2012/0314538 A1 | 12/2012 | Washbourne et al. |
| 2012/0316790 A1 | 12/2012 | Washbourne et al. |
| 2012/0316844 A1 | 12/2012 | Shah et al. |
| 2013/0081752 A1 | 4/2013 | Kurimura et al. |
| 2013/0238246 A1 | 9/2013 | Krebs et al. |
| 2013/0279290 A1 | 10/2013 | Poole |
| 2013/0282292 A1 | 10/2013 | Wang et al. |
| 2013/0311149 A1 | 11/2013 | Tang et al. |
| 2013/0311151 A1 | 11/2013 | Plessix |

FOREIGN PATENT DOCUMENTS

| | | |
|---|---|---|
| EP | 1 746 443 | 1/2007 |
| GB | 2 390 712 | 1/2004 |
| GB | 2 391 665 | 2/2004 |
| WO | WO 2006/037815 | 4/2006 |
| WO | WO 2007/046711 | 4/2007 |
| WO | WO 2008/042081 | 4/2008 |
| WO | WO 2008/123920 | 10/2008 |
| WO | WO 2009/067041 | 5/2009 |
| WO | WO 2009/117174 | 9/2009 |
| WO | WO 2010/085822 | 7/2010 |
| WO | WO 2011/040926 | 4/2011 |
| WO | WO 2011/091216 | 7/2011 |
| WO | WO 2011/093945 | 8/2011 |
| WO | WO 2012/024025 | 2/2012 |
| WO | 2012/047384 | 4/2012 |
| WO | WO 2012/041834 | 4/2012 |
| WO | WO 2012/047384 | 4/2012 |
| WO | WO 2012/083234 | 6/2012 |
| WO | WO 2012/134621 | 10/2012 |
| WO | WO 2012/170201 | 12/2012 |
| WO | WO 2013/081752 | 6/2013 |

OTHER PUBLICATIONS

Abt, D.L. et al. (2010), "North American lithospheric discontinuity structured imaged by Ps And Sp receiver functions", *J. Geophys. Res.*, 24 pgs.

Akerberg, P., et al. (2008), "Simultaneous source separation by sparse radon transform," 78th SEG Annual International Meeting, *Expanded Abstracts*, pp. 2801-2805.

Aki, K. et al. (1980), "Quantitative Seismology: Theory and Methods vol. I—Chapter 7—Surface Waves in a Vertically Heterogenous Medium," W.H. Freeman and Co., pp. 259-318.

Aki, K. et al. (1980), "Quantitative Seismology: Theory and Methods vol. I," W.H. Freeman and Co., p. 173.

Aki et al. (1980), "Quantitative Seismology, Theory and Methods," Chapter 5.20, W.H. Freeman & Co., pp. 133-155.

Amundsen, L. (2001), "Elimination of free-surface related multiples without need of the source wavelet," *Geophysics* 60(1), pp. 327-341.

Anderson, J.E. et al. (2008), "Sources Near the Free-Surface Boundary: Pitfalls for Elastic Finite-Difference Seismic Simulation and Multi-Grid Waveform Inversion," 70$^{th}$ EAGE Conf. & Exh., 4 pgs.

Barr, F.J. et al. (1989), "Attenuation of Water-Column Reverberations Using Pressure and Velocity Detectors in a Water-Bottom Cable," 59$^{th}$ Annual SEG meeting, *Expanded Abstracts*, pp. 653-656.

Baumstein, A. et al. (2009), "Scaling of the Objective Function Gradient for Full Wavefield Inversion," SEG Houston 2009 Int'l. Expo and Annual Meeting, pp. 224-2247.

Beasley, C. (2008), "A new look at marine simultaneous sources," *The Leading Edge* 27(7), pp. 914-917.

Beasley, C. (2012), "A 3D simultaneous source field test processed using alternating projections: a new active separation method," *Geophsyical Prospecting* 60, pp. 591-601.

Beaty, K.S. et al. (2003), "Repeatability of multimode Rayleigh-wave dispersion studies," *Geophysics* 68(3), pp. 782-790.

Beaty, K.S. et al. (2002), "Simulated annealing inversion of multimode Rayleigh wave dispersion waves for geological structure," *Geophys. J. Int.* 151, pp. 622-631.

Becquey, M. et al. (2002), "Pseudo-Random Coded Simultaneous Vibroseismics," SEG Int'l. Exposition and 72th Annl. Mtg., 4 pgs.

Ben-Hadj-Ali, H. et al. (2009), "Three-dimensional frequency-domain full waveform inversion with phase encoding," *SEG Expanded Abstracts*, pp. 2288-2292.

Ben-Hadj-Ali, H. et al. (2011), "An efficient frequency-domain full waveform inversion method using simultaneous encoded sources," *Geophysics* 76(4), pp. R109-R124.

Benitez, D. et al. (2001), "The use of the Hilbert transform in ECG signal analysis," *Computers in Biology and Medicine* 31, pp. 399-406.

Berenger, J-P. (1994), "A Perfectly Matched Layer for the Absorption of Electromagnetic Waves," *J. of Computational Physics* 114, pp. 185-200.

Berkhout, A.J. (1987), "Applied Seismic Wave Theory," Elsevier Science Publishers, p. 142.

Berkhout, A.J. (1992), "Areal shot record technology," *Journal of Seismic Exploration* 1, pp. 251-264.

Berkhout, A.J. (2008), "Changing the mindset in seismic data acquisition," *The Leading Edge* 27(7), pp. 924-938.

(56) References Cited

OTHER PUBLICATIONS

Beylkin, G (1985), "Imaging of discontinuities in the inverse scattring problem by inversion of a causal generalized Radon transform," *J Math. Phys.* 26, pp. 99-108.
Biondi, B. (1992), "Velocity estimation by beam stack," *Geophysics* 57(8), pp. 1034-1047.
Bonomi, E. et al. (2006), "Wavefield Migration plus Monte Carlo Imaging of 3D Prestack Seismic Data," *Geophysical Prospecting* 54, pp. 505-514.
Boonyasiriwat, C. et al. (2010), 3D Multisource Full-Waveform using Dynamic Random Phase Encoding, SEG Denver 2010 Annual Meeting, pp. 1044-1049.
Boonyasiriwat, C. et al. (2010), 3D Multisource Full-Waveform using Dynamic Random Phase Encoding, SEG Denver 2010 Annual Meeting, pp. 3120-3124.
Bunks, C., et al. (1995), "Multiscale seismic waveform inversion," *Geophysics* 60, pp. 1457-1473.
Burstedde, G. et al. (2009), "Algorithmic strategies for full waveform inversion: 1D experiments," *Geophysics* 74(6), pp. WCC17-WCC46.
Chavent, G. et al. (1999), "An optimal true-amplitude least-squares prestack depth-migration operator," *Geophysics* 64(2), pp. 508-515.
Choi, Y. et al. (2011), "Application of encoded multisource waveform inversion to marine-streamer acquisition based on the global correlation," 73$^{rd}$ EAGE Conference, *Abstract*, pp. F026.
Choi, Y et al. (2012), "Application of multi-source waveform inversion to marine stream data using the global correlation norm," *Geophysical Prospecting* 60, pp. 748-758.
Clapp, R.G. (2009), "Reverse time migration with random boundaries," SEG International Exposition and Meeting, *Expanded Abstracts*, pp. 2809-2813.
Dai, W. et al. (2010), "3D Multi-source Least-squares Reverse Time Migration," SEG Denver 2010 Annual Meeting, pp. 3120-3124.
Delprat-Jannuad, F. et al. (2005), "A fundamental limitation for the reconstruction of impedance profiles from seismic data," *Geophysics* 70(1), pp. R1-R14.
Dickens, T.A. et al. (2011), RTM angle gathers using Poynting vectors, *SEG Expanded Abstracts* 30, pp. 3109-3113.
Donerici, B. et al. (1005), "Improved FDTD Subgridding Algorithms via Digital Filtering and Domain Overriding," *IEEE Transactions on Antennas and Propagation* 53(9), pp. 2938-2951.
Downey, N. et al. (2011), "Random-Beam Full-Wavefield Inversion," 2011 San Antonio Annual Meeting, pp. 2423-2427.
Dunkin, J.W. et al. (1973), "Effect of Normal Moveout on a Seismic Pluse," *Geophysics* 38(4), pp. 635-642.
Dziewonski A. et al. (1981), "Preliminary Reference Earth Model", *Phys. Earth Planet. Int.* 25(4), pp. 297-356.
Ernst, F.E. et al. (2000), "Tomography of dispersive media," *J Acoust. Soc. Am* 108(1), pp. 105-116.
Ernst, F.E. et al. (2002), "Removal of scattered guided waves from seismic data," *Geophysics* 67(4), pp. 1240-1248.
Esmersoy, C. (1990), "Inversion of P and SV waves from multicomponent offset vertical seismic profiles", *Geophysics* 55(1), pp. 39-50.
Etgen, J.T. et al. (2007), "Computational methods for large-scale 3D acoustic finite-difference modeling: A tutorial," *Geophysics* 72(5), pp. SM223-SM230.
Fallat, M.R. et al. (1999), "Geoacoustic inversion via local, global, and hybrid algorithms," *Journal of the Acoustical Society of America* 105, pp. 3219-3230.
Fichtner, A. et al. (2006), "The adjoint method in seismology I. Theory," *Physics of the Earth and Planetary Interiors* 157, pp. 86-104.
Forbriger, T. (2003), "Inversion of shallow-seismic wavefields: I. Wavefield transformation," *Geophys. J. Int.* 153, pp. 719-734.
Gao, H. et al. (2008), "Implementation of perfectly matched layers in an arbitrary geometrical boundary for leastic wave modeling," Geophysics J. Int. 174, pp. 1029-1036.
Gibson, B. et al. (1984), "Predictive deconvolution and the zero-phase source," *Geophysics* 49(4), pp. 379-397.
Godfrey, R. J. et al. (1998), "Imaging the Foiaven Ghost," *SEG Expanded Abstracts*, 4 pgs.
Griewank, A. (1992), "Achieving logarithmic growth of temporal and spatial complexity in reverse automatic differentiation," 1 *Optimization Methods and Software*, pp. 35-54.
Griewank, A. (2000), Evaluating Derivatives: Principles and Techniques of Algorithmic Differentiation, Society for Industrial and Applied Mathematics, 49 pgs.
Griewank, A. et al. (2000), "Algorithm 799: An implementation of checkpointing for the reverse or adjoint mode of computational differentiation," 26 *ACM Transactions on Mathematical Software*, pp. 19-45.
Griewank, A. et al. (1996), "Algorithm 755: A package for the automatic differentiation of algorithms written in C/C++," *ACM Transactions on Mathematical Software* 22(2), pp. 131-167.
Haber, E. et al. (2010), "An effective method for parameter estimation with PDE constraints with multiple right hand sides," Preprint—UBC http://www.math.ubc.ca/~haber/pubs/PdeOptStochV5.pdf.
Hampson, D.P. et al. (2005), "Simultaneous inversion of pre-stack seismic data," SEG 75$^{th}$ Annual Int'l. Meeting, *Expanded Abstracts*, pp. 1633-1637.
Heinkenschloss, M. (2008), :"Numerical Solution of Implicity Constrained Optimization Problems," CAAM Technical Report TR08-05, 25 pgs.
Helbig, K. (1994), "Foundations of Anisotropy for Exploration Seismics," Chapter 5, pp. 185-194.
Herrmann, F.J. (2010), "Randomized dimensionality reduction for full-waveform inversion," *EAGE abstract* G001, EAGE Barcelona meeting, 5 pgs.
Holschneider, J. et al. (2005), "Characterization of dispersive surface waves using continuous wavelet transforms," *Geophys. J. Int.* 163, pp. 463-478.
Hu, L.Z. et al. (1987), "Wave-field transformations of vertical seismic profiles," *Geophysics* 52, pp. 307-321.
Huang, Y. et al. (2012), "Multisource least-squares migration of marine streamer and land data with frequency-division encoding," *Geophysical Prospecting* 60, pp. 663-680.
Igel, H. et al. (1996), "Waveform inversion of marine reflection seismograms for *P* impedance and Poisson's ratio," *Geophys. J. Int.* 124, pp. 363-371.
Ikelle, L.T. (2007), "Coding and decoding: Seismic data modeling, acquisition, and processing," 77th Annual Int'l. Meeting, SEG Expanded Abstracts, pp. 66-70.
Jackson, D.R. et al. (1991), "Phase conjugation in underwater acoustics," *J. Acoust. Soc. Am.* 89(1), pp. 171-181.
Jing, X. et al. (2000), "Encoding multiple shot gathers in prestack migration," *SEG International Exposition and 70$^{th}$ Annual Meeting Expanded Abstracts*, pp. 786-789.
Kennett, B.L.N. (1991), "The removal of free surface interactions from three-component seismograms", *Geophys. J. Int.* 104, pp. 153-163.
Kennett, B.L.N. et al. (1988), "Subspace methods for large inverse problems with multiple parameter classes," *Geophysical J.* 94, pp. 237-247.
Krebs, J.R. (2008), "Fast Full-wavefield seismic inversion using encoded sources," *Geophysics* 74(6), pp. WCC177-WCC188.
Krohn, C.E. (1984), "Geophone ground coupling," *Geophysics* 49(6), pp. 722-731.
Kroode, F.T. et al. (2009), "Wave Equation Based Model Building and Imaging in Complex Settings," OTC 20215, 2009 Offshore Technology Conf., Houston, TX, May 4-7, 2009, 8 pgs.
Kulesh, M. et al. (2008), "Modeling of Wave Dispersion Using Continuous Wavelet Transforms II: Wavelet-based Frequency-velocity Analysis," *Pure Applied Geophysics* 165, pp. 255-270.
Lancaster, S. et al. (2000), "Fast-track 'colored' inversion," 70$^{th}$ SEG Ann. Meeting, *Expanded Abstracts*, pp. 1572-1575.
Lazaratos, S. et al. (2009), "Inversion of Pre-migration Spectral Shaping," 2009 SEG Houston Int'l. Expo. & Ann. Meeting, *Expanded Abstracts*, pp. 2383-2387.
Lazaratos, S. (2006), "Spectral Shaping Inversion for Elastic and Rock Property Estimation," *Research Disclosure*, Issue 511, pp. 1453-1459.

(56) References Cited

OTHER PUBLICATIONS

Lazaratos, S. et al. (2011), "Improving the convergence rate of full wavefield inversion using spectral shaping," *SEG Expanded Abstracts* 30, pp. 2428-2432.

Lecomte, I. (2008), "Resolution and illumination analyses in PSDM: A ray-based approach," *The Leading Edge*, pp. 650-663.

Lee, S. et al. (2010), "Subsurface parameter estimation in full wavefield inversion and reverse time migration," SEG Denver 2010 Annual Meeting, pp. 1065-1069.

Levanon, N. (1988), "Radar Principles," Chpt. 1, John Whiley & Sons, New York, pp. 1-18.

Liao, Q. et al. (1995), "2.5D full-wavefield viscoacoustic inversion," *Geophysical Prospecting* 43, pp. 1043-1059.

Liu, F. et al. (2007), "Reverse-time migration using one-way wavefield imaging condition," *SEG Expanded Abstracts* 26, pp. 2170-2174.

Liu, F. et al. (2011), "An effective imaging condition for reverse-time migration using wavefield decomposition," *Geophysics* 76, pp. S29-S39.

Maharramov, M. et al. (2007), "Localized image-difference wave-equation tomography," SEG Annual Meeting, *Expanded Abstracts*, pp. 3009-3013.

Malmedy, V. et al. (2009), "Approximating Hessians in unconstrained optimization arising from discretized problems," *Computational Optimization and Applications*, pp. 1-16.

Marcinkovich, C. et al. (2003), "On the implementation of perfectly matched layers in a three-dimensional fourth-order velocity-stress finite difference scheme," *J. of Geophysical Research* 108(B5), 2276.

Martin, G.S. et al. (2006), "Marmousi2: An elastic upgrade for Marmousi," *The Leading Edge*, pp. 156-166.

Meier, M.A. et al. (2009), "Converted wave resolution," Geophysics, 74(2):doi:10.1190/1.3074303, pp. Q1-Q16.

Moghaddam, P.P. et al. (2010), "Randomized full-waveform inversion: a dimenstionality-reduction approach," $80^{th}$ SEG Ann. Meeting, *Expanded Abstracts*, pp. 977-982.

Mora, P. (1987), "Nonlinear two-dimensional elastic inversion of multi-offset seismic data," *Geophysics* 52, pp. 1211-1228.

Mora, P. (1987), "Elastic Wavefield Inversion," PhD Thesis, Stanford University, pp. 22-25.

Mora, P. (1989), "Inversion = migration + tomography," *Geophysics* 64, pp. 888-901.

Nazarian, S. et al. (1983), "Use of spectral analysis of surface waves method for determination of moduli and thickness of pavement systems," *Transport Res. Record* 930, pp. 38-45.

Neelamani, R., (2008), "Simultaneous sourcing without compromise," 70th Annual Int'l. Conf. and Exh., EAGE, 5 pgs.

Neelamani, R. (2009), "Efficient seismic forward modeling using simultaneous sources and sparsity," *SEG Expanded Abstracts*, pp. 2107-2111.

Nocedal, J. et al. (2006), "*Numerical Optimization, Chapt. 7—Large-Scale Unconstrained Optimization*," Springer, New York, $2^{nd}$ Edition, pp. 165-176.

Nocedal, J. et al. (2000), "Numerical Optimization-Calculating Derivatives," Chapter 8, Springer Verlag, pp. 194-199.

Ostmo, S. et al. (2002), "Finite-difference iterative migration by linearized waveform inversion in the frequency domain," SEG Int'l. Expo. & $72^{nd}$ Ann. Meeting, 4 pgs.

Park, C.B. et al. (1999), "Multichannel analysis of surface waves," *Geophysics* 64(3), pp. 800-808.

Park, C.B. et al. (2007), "Multichannel analysis of surface waves (MASW)—active and passive methods," *The Leading Edge*, pp. 60-64.

Pica, A. et al. (2005), "3D Surface-Related Multiple Modeling, Principles and Results," 2005 SEG Ann. Meeting, *SEG Expanded Abstracts* 24, pp. 2080-2083.

Plessix, R.E. et al. (2004), "Frequency-domain finite difference amplitude preserving monition," *Geophys. J. Int.* 157, pp. 975-987.

Porter, R.P. (1989), "Generalized holography with application to inverse scattering inverse source problems," In E. Wolf, editor, Progress in Optics XXVII, Elsevier, pp. 317-397.

Pratt, R.G. et al. (1998), "Gauss-Newton and full Newton methods in frequency-space seismic waveform inversion," *Geophys. J. Int.* 133, pp. 341-362.

Pratt, R.G. (1999), "Seismic waveform inversion in the frequency domain, Part 1: Theory and verification in a physical scale model," *Geophysics* 64, pp. 888-901.

Rawlinson, N. et al. (2008), "A dynamic objective function technique for generating multiple solution models in seismic tomography," *Geophys. J. Int.* 178, pp. 295-308.

Rayleigh, J.W.S. (1899), "On the transmission of light through an atmosphere containing small particles in suspension, and on the origin of the blue of the sky," Phil. Mag. 47, pp. 375-384.

Romero, L.A. et al. (2000), Phase encoding of shot records in prestack migration, *Geophysics* 65, pp. 426-436.

Ronen S. et al. (2005), "Imaging Downgoing waves from Ocean Bottom Stations," *SEG Expanded Abstracts*, pp. 963-967.

Routh, P. et al. (2011), "Encoded Simultaneous Source Full-Wavefield Inversion for Spectrally-Shaped Shaped Marine Streamer Data," SEG San Antonio 2011 Ann. Meeting, pp. 2433-2438.

Ryden, N. et al. (2006), "Fast simulated annealing inversion of surface waves on pavement using phase-velocity spectra," *Geophysics* 71(4), pp. R49-R58.

Sambridge, M.S. et al. (1991), "An Alternative Strategy for Non-Linear Inversion of Seismic Waveforms," *Geophysical Prospecting* 39, pp. 723-736.

Schoenberg, M. et al. (1989), "A calculus for finely layered anisotropic media," *Geophysics* 54, pp. 581-589.

Schuster, G.T. et al. (2010), "Theory of Multisource Crosstalk Reduction by Phase-Encoded Statics," SEG Denver 2010 Ann. Meeting, pp. 3110-3114.

Sears, T.J. et al. (2008), "Elastic full waveform inversion of multi-component OBC seismic data," *Geophysical Prospecting* 56, pp. 843-862.

Sheen, D-H. et al. (2006), "Time domain Gauss-Newton seismic waveform inversion in elastic media," Geophysics J. Int. 167, pp. 1373-1384.

Shen, P. et al. (2003), "Differential semblance velocity analysis by wave-equation migration," $73^{rd}$ Ann. Meeting of Society of Exploration Geophysicists, 4 pgs.

Sheng, J. et al. (2006), "Early arrival waveform tomography on near-surface refraction data," *Geophysics* 71, pp. U47-U57.

Sheriff, R.E.et al. (1982), "*Exploration Seismology*", pp. 134-135.

Shih, R-C. et al. (1996), "Iterative pre-stack depth migration with velocity analysis," *Terrestrial, Atmospheric & Oceanic Sciences* 7(2), pp. 149-158.

Shin, C. et al. (2001), "Waveform inversion using a logarithmic wavefield," *Geophysics* 49, pp. 592-606.

Simard, P.Y. et al. (1990), "Vector Field Restoration by the Method of Convex Projections," *Computer Vision, Graphics and Image Processing* 52, pp. 360-385.

Sirgue, L. (2004), "Efficient waveform inversion and imaging: A strategy for selecting temporal frequencies," *Geophysics* 69, pp. 231-248.

Soubaras, R. et al. (2007), "Velocity model building by semblance maximization of modulated-shot gathers," *Geophysics* 72(5), pp. U67-U73.

Spitz, S. (2008), "Simultaneous source separation: a prediction-subtraction approach," 78th Annual Int'l. Meeting, *SEG Expanded Abstracts*, pp. 2811-2815.

Stefani, J. (2007), "Acquisition using simultaneous sources," 69th Annual Conf. and Exh., *EAGE Extended Abstracts*, 5 pgs.

Symes, W.W. (2007), "Reverse time migration with optimal checkpointing," *Geophysics* 72(5), pp. P.SM213-SM221.

Symes, W.W. (2009), "Interface error analysis for numerical wave propagation," *Compu. Geosci.* 13, pp. 363-371.

Tang, Y. (2008), "Wave-equation Hessian by phase encoding," *SEG Expanded Abstracts* 27, pp. 2201-205.

Tang, Y. (2009), "Target-oriented wave-equation least-squares migration/inversion with phase-encoded encoded Hessian," *Geophysics* 74, pp. WCA95-WCA107.

(56) References Cited

OTHER PUBLICATIONS

Tang, Y. et al. (2010), "Preconditioning full waveform inversion with phase-encoded Hessian," *SEG Expanded Abstracts* 29, pp. 1034-1037.

Tarantola, A. (1986), "A strategy for nonlinear elastic inversion of seismic reflection data," *Geophysics* 51(10), pp. 1893-1903.

Tarantola, A. (1988), "Theoretical background for the inversion of seismic waveforms, including elasticity and attenuation," *Pure and Applied Geophysics* 128, pp. 365-399.

Tarantola, A. (2005), "Inverse Problem Theory and Methods for Model Parameter Estimation," *SIAM*, pp. 79.

Tarantola, A. (1984), "Inversion of seismic reflection data in the acoustic approximation," *Geophysics* 49, pp. 1259-1266.

Trantham, E.C. (1994), "Controlled-phase acquisition and processing," *SEG Expanded Abstracts* 13, pp. 890-894.

Tsvankin, I. (2001), "Seismic Signatures and Analysis of Reflection Data in Anisotropic Media," Elsevier Science, p. 8.

Valenciano, A.A. (2008), "Imaging by Wave-Equation Inversion," A Dissertation, Stanford University, 138 pgs.

van Groenestijn, G.J.A. et al. (2009), "Estimating primaries by sparse inversion and application to near-offset reconstruction," *Geopyhsics* 74(3), pp. A23-A28.

van Manen, D.J. (2005), "Making wave by time reversal," SEG International Exposition and 75$^{th}$ Annual Meeting, *Expanded Abstracts*, pp. 1763-1766.

Verschuur, D.J. (2009), Target-oriented, least-squares imaging of blended data, 79th Annual Int'l. Meeting, *SEG Expanded Abstracts*, pp. 2889-2893.

Verschuur, D.J. et al. (1992), "Adaptive surface-related multiple elimination," *Geophysics* 57(9), pp. 1166-1177.

Verschuur, D.J. (1989), "Wavelet Estimation by Prestack Multiple Elimination," *SEG Expanded Abstracts* 8, pp. 1129-1132.

Versteeg, R. (1994), "The Marmousi experience: Velocity model determination on a synthetic complex data set," *The Leading Edge*, pp. 927-936.

Vigh, D. et al. (2008), "3D prestack plane-wave, full-waveform inversion," *Geophysics* 73(5), pp. VE135-VE144.

Wang, Y. (2007), "Multiple prediction through inversion: Theoretical advancements and real data application," Geophysics 72(2), pp. V33-V39.

Wang, K. et al. (2009), "Simultaneous full-waveform inversion for source wavelet and earth model," SEG Int'l. Expo. & Ann. Meeting, Expanded Abstracts, pp. 2537-2541.

Weglein, A.B. (2003), "Inverse scattering series and seismic exploration," *Inverse Problems* 19, pp. R27-R83.

Wong, M. et al. (2010), "Joint least-squares inversion of up- and down-going signal for ocean bottom data sets," *SEG Expanded Abstracts* 29, pp. 2752-2756.

Wu R-S. et al. (2006), "Directional illumination analysis using beamlet decomposition and propagation," *Geophysics* 71(4), pp. S147-S159.

Xia, J. et al. (2004), "Utilization of high-frequency Rayleigh waves in near-surface geophysics," *The Leading Edge*, pp. 753-759.

Xie, X. et al. (2002), "Extracting angle domain information from migrated wavefield," *SEG Expanded Abstracts* 21, pp. 1360-1363.

Xie, X.-B. et al. (2006), "Wave-equation-based seismic illumination analysis," *Geophysics* 71(5), pp. S169-S177.

Yang, K. et al. (2000), "Quasi-Orthogonal Sequences for Code-Division Multiple-Access Systems," *IEEE Transactions on Information Theory* 46(3), pp. 982-993.

Yoon, K. et al. (2004), "Challenges in reverse-time migration," *SEG Expanded Abstracts* 23, pp. 1057-1060.

Young, J. et al. (2011), "An application of random projection to parameter estimation in partial differential equations," *SIAM*, 20 pgs.

Zhang, Y. (2005), "Delayed-shot 3D depth migration," *Geophysics* 70, pp. E21-E28.

Ziolkowski, A. (1991), "Why don't we measure seismic signatures?," *Geophysics* 56(2), pp. 190-201.

U.S. Appl. No. 25/272,827, filed May 8, 2014, Baumstein et al.
U.S. Appl. No. 14/286,107, filed May 23, 2014, Hu et al.
U.S. Appl. No. 14/311,945, filed Jun. 20, 2014, Bansal et al.
U.S. Appl. No. 14/329,431, filed Jul. 11, 2014, Krohn et al.
U.S. Appl. No. 14/330,767, filed Jul. 14, 2014, Tang et al.

Smith, G.C. et al. (1987), "Weighted Stacking for Rock Property Estimation and Detection of Gas," *Geophysical Prospecting* 35(5), pp. 993-1014.

*International Search Report*, PCT/US2014/037122, dated Oct. 22, 2014.

\* cited by examiner

MULTI-PARAMETER INVERSION THROUGH OFFSET DEPENDENT ELASTIC FWI

CROSS-REFERENCE TO RELATED APPLICATION

This application claims the benefit of U.S. Provisional Patent Application 61/827,474, filed May 24, 2013, entitled "Multi-Parameter Inversion through Offset Dependent Elastic FWI," the entirety of which is incorporated by reference herein.

FIELD OF THE INVENTION

The invention relates generally to the field of geophysical prospecting including prospecting for hydrocarbons and, more particularly, to seismic data processing. Specifically, the invention is a method for elastic full wavefield inversion ("FWI") of seismic data to obtain a subsurface model of multiple physical parameters.

BACKGROUND OF THE INVENTION

An inversion process in geophysics data processing usually, and in the case of this document as well, refers to the process of transforming seismic reflection data into a quantitative rock-property description of a reservoir in the form of a subsurface earth model. Such a model needs three parameters, which are density ($\rho$), P-wave velocity ($V_P$) and S-wave velocity ($V_S$) to describe it, if the model is assumed to be isotropic. Additional parameters are needed in a more general subsurface model that includes anisotropy and attenuation. There are many techniques used in inversion at seismic resolution, such as post-stack or pre-stack AVO inversion and Full-Waveform Inversion (FWI).

It is well known that PP reflection (P-wave down/P-wave up) at normal incident angle is largely determined by the acoustic impedance $I_p = \rho V_p$. In order to estimate $I_p$ from seismic data, it is usually sufficient to consider only P-wave propagation in FWI to save processing time. For that purpose, modeling of wave propagation depends only on $\rho$ and $V_p$. However, $I_p$ alone is not always a good indicator of reservoir rocks and types. It is know that fluid types can be better retrieved from elastic parameters such as $V_P/V_S$. As a result, multi-parameter inversion for both acoustic and elastic parameters has become desirable, perhaps almost necessary, in reservoir characterization.

Multi-parameter inversion through elastic FWI has a unique role in delineating reservoir characters as it is based on accurate modeling of elastic wave propagation. Elastic FWI is a highly expensive process for two main reasons. First, finite difference modeling becomes far more expensive than under the acoustic (P-wave only) assumption due to denser computational grids needed for computer simulation of shear wave propagation. Second, multi-parameter inversion requires many more iterations than acoustic FWI to achieve convergence and reduce crosstalk between different parameters. In reservoir characterization, the most important parameters to describe rock properties are acoustic impedance $I_p$ and the velocity ratio $V_p/V_S$. Therefore, there is a need for an FWI method than can robustly invert for $I_p$ and $V_P/V_S$ in a small number of iterations (preferably ~10) to make it practical in business applications such as reservoir characterization and velocity model building.

There are a wide variety of methods to estimate rock properties from seismic data. The procedure proposed by Hampson et al. (2005) represents a typical workflow in pre-stack AVO inversion. In their workflow, $I_P$, $I_S$ and density are estimated simultaneously based on AVO in angle gathers and the Aki-Richards equations (Aki and Richards, 2002). Their approach is based on linearized approximation for reflectivity instead of the iterative process of simulating elastic waves and matching waveforms. Computational cost is therefore much cheaper in pre-stack inversion due to the linearized approximation. In contrast, elastic FWI, although a much more expensive process, has the potential to generate superior results.

SUMMARY OF THE INVENTION

The present invention is a robust and efficient computer-implemented method for multi-parameter inversion using elastic FWI. This method decomposes data into offset or angle groups and performs elastic FWI on them in sequential order. This method can significantly speed up convergence, by a factor of approximately 10 in some examples, compared to elastic FWI carried out without the improvements of the present invention. The present inventive approach draws upon the relationship between reflection energy and reflection angle, or equivalently, offset dependence in elastic FWI. From the classic AVO theory by Aki and Richards (1980), it is known that the amplitudes of small angle (near offset) reflections are largely determined by acoustic impedance alone, independent for the most part of Vp/Vs. Large angle (middle and far offset) reflections are affected by Ip, Vp/Vs, and other earth parameters such as density and anisotropy. Therefore, the present inventive method decomposes data into angle/offset groups in performing multi-parameter FWI to reduce crosstalk between different model parameters, i.e. between the inversion unknowns. For purposes of this disclosure, including the appended claims, it shall be understood that decomposing the data into angle groups is equivalent to decomposing the data into offset groups, and the one term shall be understood to include the other.

In one embodiment, the invention is a computer-implemented method for inversion of seismic data to infer subsurface physical property parameters including P-wave velocity, S-wave velocity, and density, comprising extracting only PP mode from the seismic data, and inverting the PP mode data sequentially in two or more different offset ranges, each offset range inversion determining at least one physical property parameter, wherein in a second and subsequent inversions, parameters determined in a previous inversion are held fixed.

In another embodiment, the invention is a method for inversion of seismic data to infer at least P-wave velocity, S-wave velocity, and density, comprising: (a) taking only PP-mode data from the seismic data, and dividing the seismic data into a near-offset range, a mid-offset range, and a far offset range, which ranges may or may not overlap; (b) inverting the near offset range for P-wave acoustic impedance $I_P$, using a computer programmed with an acoustic inversion algorithm; (c) inverting the mid-offset range for S-wave acoustic impedance $I_S$, or for P-wave velocity $V_P$ divided by S-wave velocity $V_S$, with $I_P$ fixed at its value from (b), using an elastic inversion algorithm; (d) inverting the far-offset range for density, using an elastic inversion algorithm, with $I_P$ fixed at its value from (b) and $V_P/V_S$ fixed at a value determined from the value of $I_S$ from (c); and (e) computing $V_P$ and $V_S$ from $I_P$ and $I_S$ using definition of acoustic impedance and density as determined in (d).

In a typical case, the near-offset range might be <500 m with the far-offset range being >2 km, and the mid-offset range being in between.

BRIEF DESCRIPTION OF THE DRAWINGS

The advantages of the present invention are better understood by referring to the following detailed description and the attached drawings, in which.

Many of the drawings are color originals converted to gray scale because of patent law restrictions on the use of color.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

In the elastic FWI method presented by ("SSB" for short) Sears, Singh and Barton (2008), a three-stage workflow was proposed to estimate Vp and Vs from P-wave and S-wave seismic data: stage one, inversion for short and intermediate scale Vp using normal-incidence and wide-angle P-wave data; stage two, inversion for intermediate Vs using wide-angle P-wave data; and stage three, inversion for short-scale Vs using PS-wave data. Short and intermediate scale are terms used in the SSB paper. General speaking, short-scale refers to spatial scales that can be inferred directly from high frequency reflection energy in seismic data, and large-scale refers to spatial scales whose reflected frequencies are below typical seismic sources (e.g., 4-6 Hz in marine acquisition). Therefore, the large-scale is typically inferred from migration velocity analysis. The gap between large-scale and short-scale is usually called intermediate-scale.

While the SSB method may at first appear similar to the 3-step inventive method that is disclosed herein, there are important features that distinguish them. First, the SSB method uses different wave modes through the 3 stages. The present inventive method uses the same wave mode (PP-wave) but different reflection angle/offset through the 3 steps. It is well known that PP-wave data represent most of the recorded energy in a typical seismic survey, and therefore most of the value in marine streamer acquisition. Second, the SSB method does not separate normal-incidence and wide-angle P-wave data in stage 1 and uses them simultaneously. The present inventive method uses only small angle reflection data in step 1, which is the critical step of speeding up convergence.

A synthetic example is used to demonstrate that this method is very robust and effective in retrieving Ip and Vp/Vs. The total number of iterations needed to get Ip and Vp/Vs is ~10. Retrieving density information in step 3 (see the FIG. 1 flow chart) may require an additional 10-15 iterations in the synthetic example. Tests on field data show that accurate and robust estimate of $I_p$ and $V_p/V_s$ can be obtained within ~10 iterations as well. However, in the field data case, the reliability of the density inversion is strongly subject to the accuracy of the velocity model, including anisotropy, and data quality at far-offsets.

Figure 1:
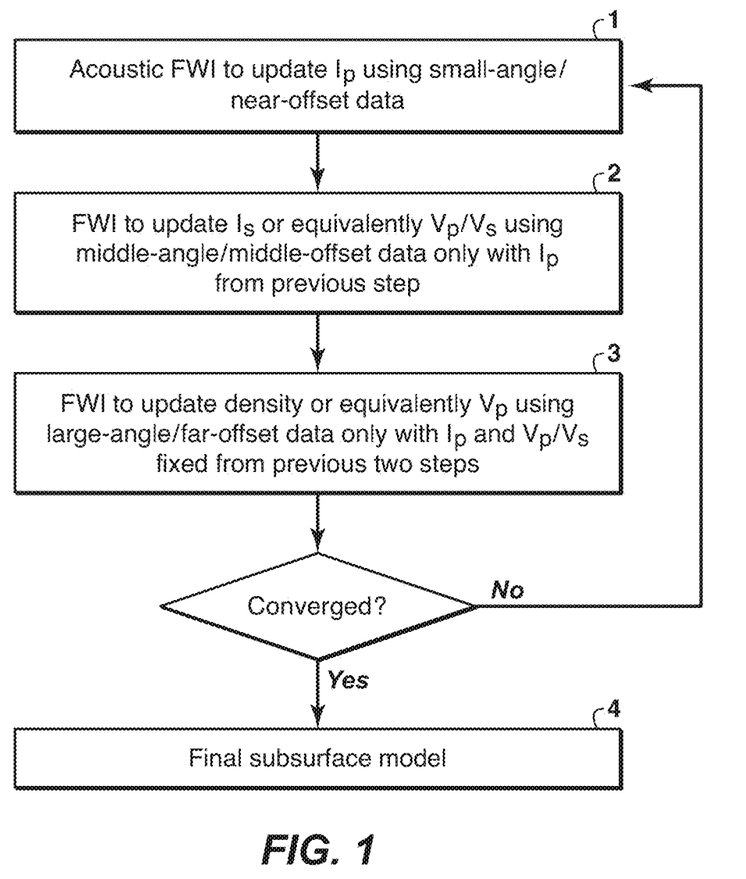
FIG. 1 is a flowchart showing basic steps in one embodiment of the seismic processing method of the present invention.
Figure 2:
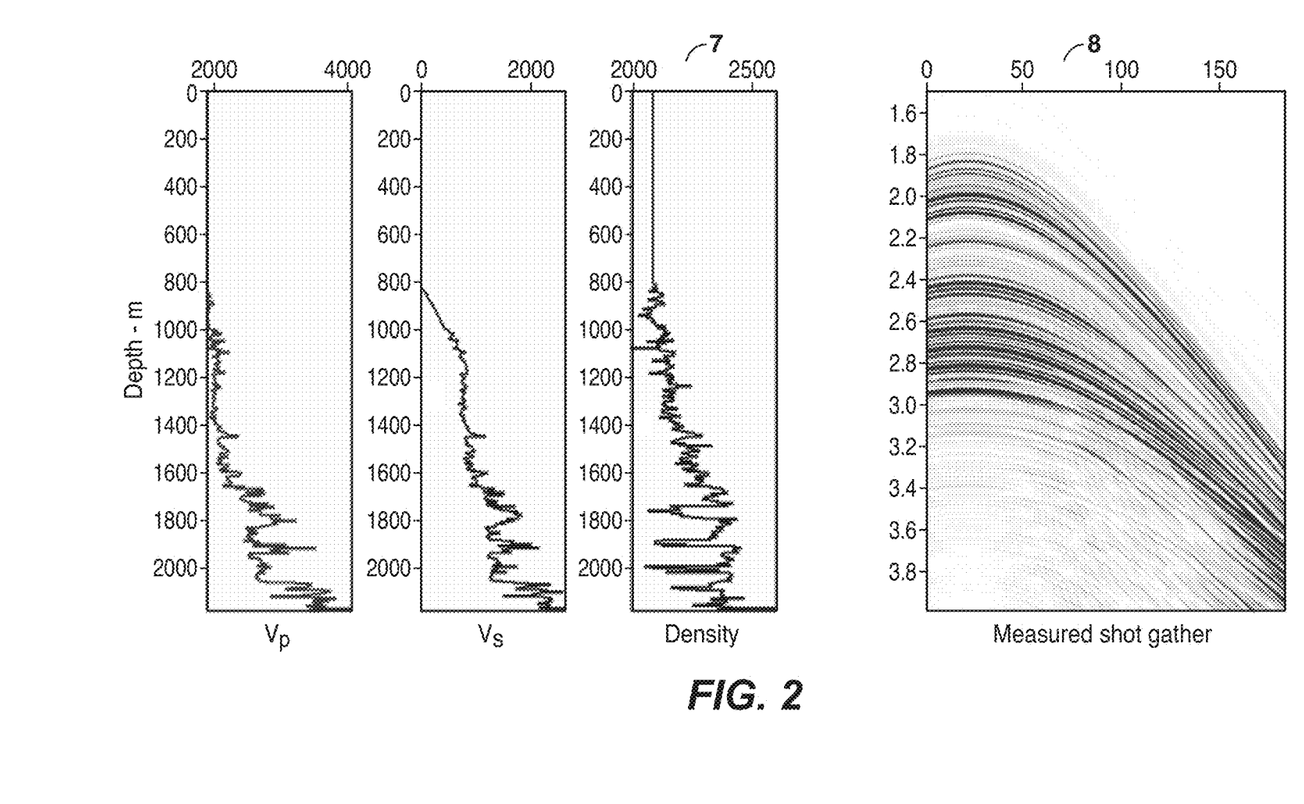
FIG. 2 shows the true Vp, Vs and density profiles used to generate a synthetic gather, and one of the shot gathers.

The synthetic example follows the embodiment of the present inventive method illustrated in the flow chart of FIG. 1. Synthetic (computer simulated) data are used in this test example to demonstrate the invention. The data set is generated by isotropic elastic finite difference modeling on a layered (1D) earth model shown in FIG. 2, where $V_P$, $V_S$ and density are plotted vs. depth in the subsurface. The units for velocity and density are m/s and kg/m³. A common-shot gather of the synthetic "measured" data is also shown at 8 in FIG. 2. Time in seconds is plotted on the vertical axis, and offset in meters is plotted on the horizontal axis. The maximum depth of the earth model is 2.3 km and the maximum offset available is 5 km. Due to patent law restrictions on the use of color, the depicted shot gather 8 is a gray scale conversion of a colored data display, where color is used to represent the magnitude of seismic amplitudes. The same is true of the comparisons of simulated to measured data, and the misfits, shown in FIGS. 3-6.

Step 1: Inversion of Ip from Near Offset Data.

Figure 3:
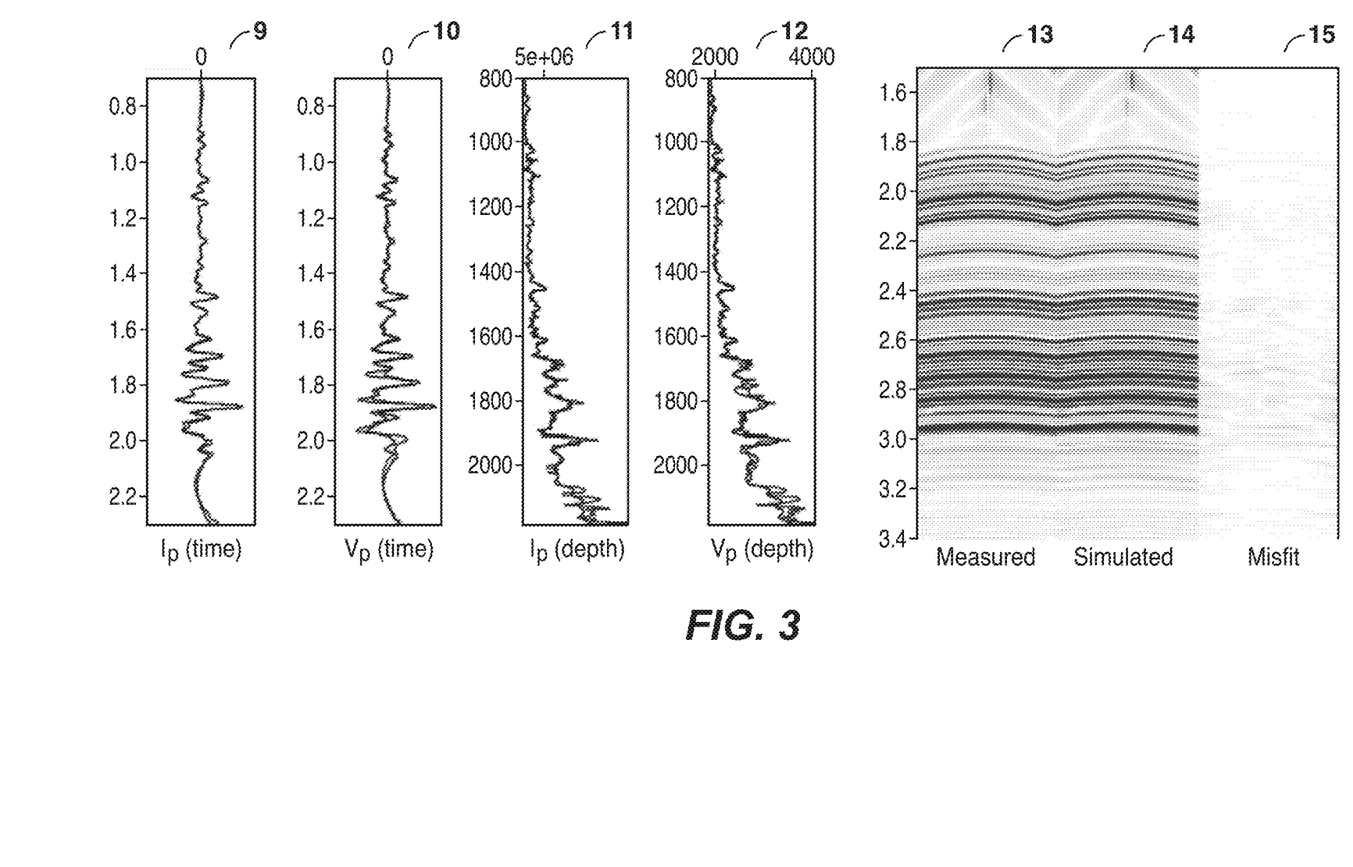
FIG. 3 shows inversion of $I_P$ using near offset data and data misfit, compared with true $I_P$ and synthetic data.

First, acoustic FWI is performed using near offset PP data (offset <500 m) to get an estimate of $I_P$, which is plotted in FIG. 3. As explained above, PP-wave data at small reflection angles (equivalently, small offsets in this example) are determined by acoustic impedance $I_p$. Elastic parameters have very little effect on small angle PP reflection data. Initial $V_P$ and density models are needed to perform acoustic FWI. The initial $V_P$ model can be derived from traditional migration velocity analysis, and for this synthetic test, a smoothed version of the "true" $V_P$ profile (used to forward model the synthetic data) in FIG. 2 was used. The initial density model can be derived from an empirical relationship between density and $V_P$. For simplicity, a constant density (1,000 kg/m³) model was used to start with. From the mathematical definition $$I_p = \rho V_p, \quad (1)$$

it is clear that inverted $I_P$ with known density $\rho$ can be directly translated to $V_p$ after dividing $I_P$ by density $\rho$. The results at iteration 5 of $I_P$ and $V_P$ are shown in both time and depth domain in FIG. 3, where the dark lines are the inverted model and the lighter shaded lines are the synthetic model. The inverted unknown is $I_p$ in this case. An estimate of $V_p$ may then be obtained by dividing inverted $I_p$ by $\rho$ according to equation (1). In FIG. 3, the inverted models are overlaid with the true synthetic models for comparison. All inversions are performed in depth domain (meters); the results are shown at 11 and 12. For comparison in certain frequency range, inversion results are converted to time (seconds) by depth-to-time conversion using the smoothed version of true $V_p$ in FIG. 2. The comparisons in time domain (9 and 10) are limited within 5-40 Hz after applying band-pass filter. From 9 and 11, it can be seen that the inverted Ip matches synthetic model very well. Since $V_p$ was derived from the inverted $I_p$ based on an assumed constant $\rho$ according to Eqn. (1), a good match between derived $V_p$ and the true $V_p$ is not expected (no updated estimation of $\rho$ has been performed yet). Thus, the initial density model (constant) is very different from the synthetic density model (7 in FIG. 2), and this difference is reflected in $V_P$ due to equation (1). This is particularly indicated in 10 by the mismatch in time domain at about 1.75 s and a similar mismatch in depth domain (12) at about 1800 m. It can be seen in 9 and 11 that the mismatch for $I_P$ is much less at that particular time and depth.

Data misfit 15, i.e. the difference between measured data 13 (from synthetic models) and simulated data 14 (from inverted $I_p$, constant density and derived $V_p$ according to (1)), is shown in FIG. 3. The difference is actually negligible. Data misfit is a very important criterion for convergence check during inversion of field (actual) data because in a field data application, a 'true model' is seldom known. Generally speaking, when other conditions are similar, better data misfit usually, but not always, indicates higher confidence in the inversion product. The negligible amount of misfit indicates that near offset data can be well explained by Ip alone.

Step 2: Inversion of $I_S$ or $V_P/V_S$ from Middle Offset (<2 km) Data with $I_P$ Fixed from the Previous Step.

Figure 4:
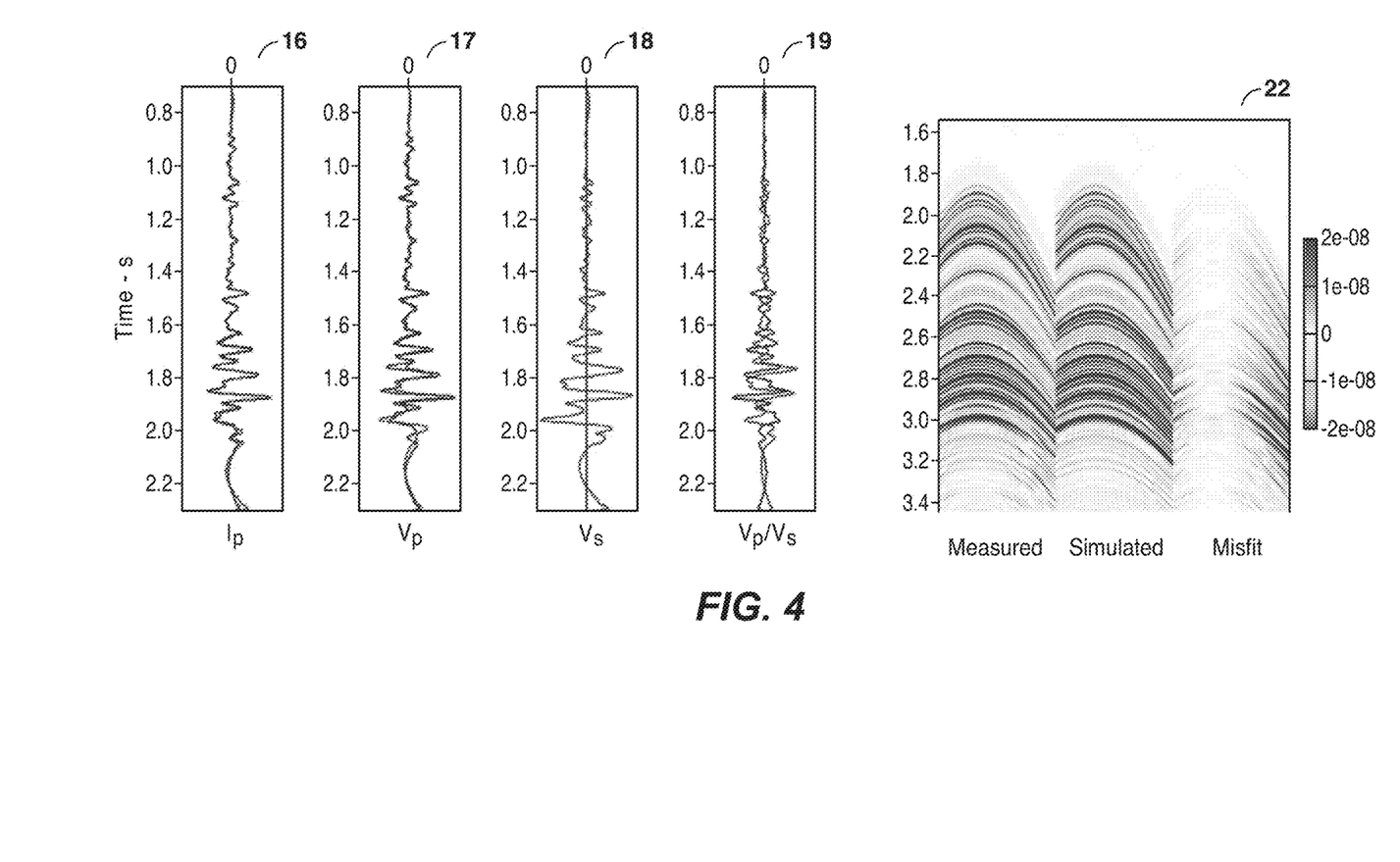
FIG. 4 shows $I_P$ alone without knowledge of $V_P/V_S$ is not able to explain middle offset data.

The following are known, simple relationships:

$$I_s = \rho V_s \quad (2)$$

$$I_s = \frac{V_s}{V_p} I_p, \quad (3)$$

where Eqn. (3) results directly from Eqs. (1) and (2). In this step 2, the inversion needs to be elastic and the inversion unknown was $V_p/V_s$. Since $I_p$ is fixed from the previous step, inverting for $V_p/V_s$ is equivalent to inverting for $I_s$ in this step according to (3). Alternatively, the inversion unknown could be $I_S$. FIG. 4 shows difference between initial Vs model (dark line, constant) and synthetic model (lighter shaded line) in 18, and the ratio Vp/Vs is shown in 19. With this initial Vs model, and Vp (shown in 17) and density (constant) from step 1, a large data misfit may be observed in panel 22 when extending the offset to 2 km, as indicated in FIG. 4. This is because $I_p$ alone is not adequate to explain middle reflection angle (offset) data. A good estimate for the second parameter, which is $V_p/V_s$ is needed to explain middle offset data. However, the data misfit at near offset is still as small as in FIG. 3 (15) because $I_P$ is fixed (16, 9) from step 1.

Figure 5:
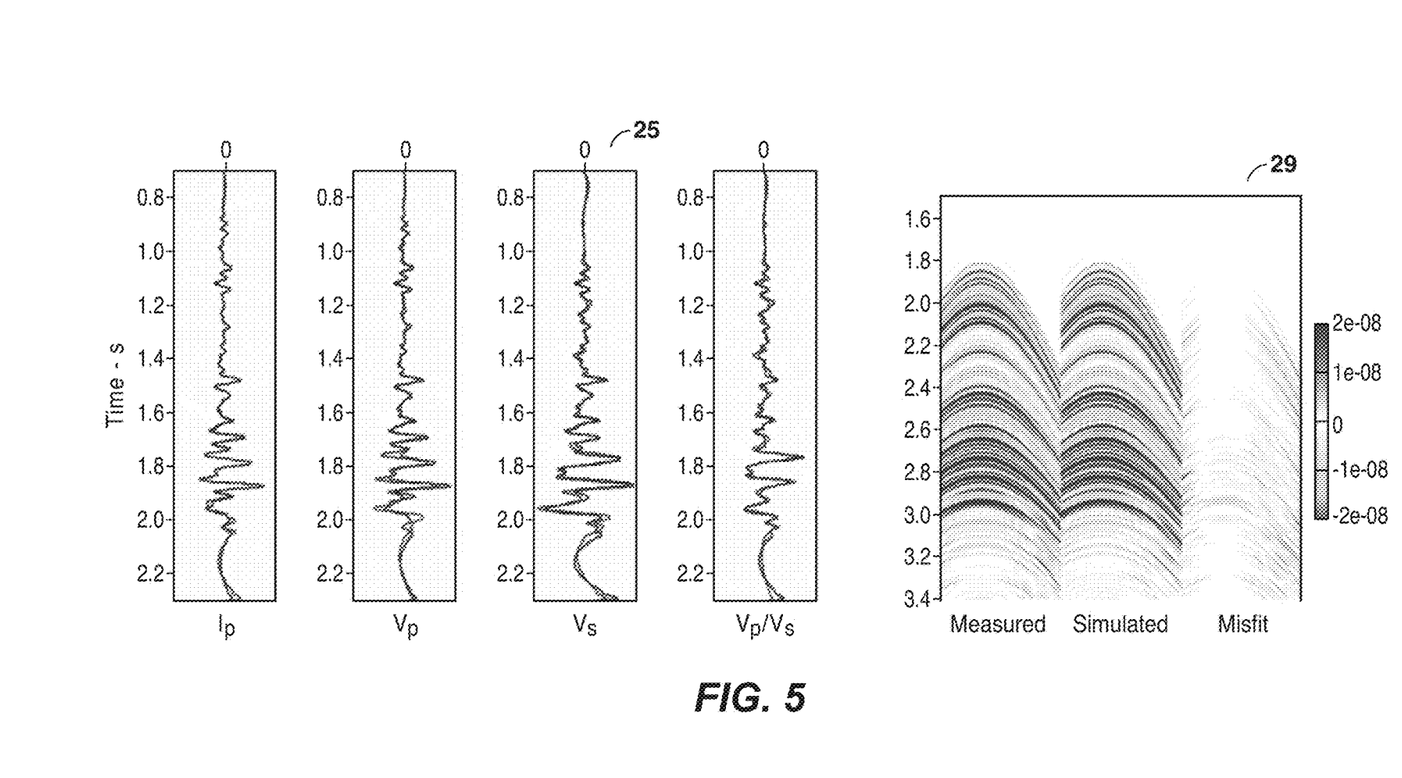
FIG. 5 shows inversion of $V_P/V_S$ with $I_P$ fixed from FIG. 2 explains seismic data up to the middle offsets.

Following the same layout as FIG. 3 used in displaying step 1 inversion results, FIG. 5 shows the inverted $V_P/V_S$ (dark line, 26) after 5 iterations, overlaid with the synthetic model (lighter shaded line, 26). The inverted model matches the synthetic model very well. As indicated at panel 29, the data misfit at the middle offset range (500 m to 2 km, scale not shown in the drawing) is greatly reduced by having the benefit of the inverted $V_P/V_S$ model. In the step 2 inversion, $I_P$ (23) and $V_P$ (24) are fixed from step 1. From equation (3), an accurate $I_s$ can be derived from accurate inversion results of $I_p$ and $V_p/V_s$. But $V_s$ from Eqn. (2) will not be as accurate if information on density is missing or inaccurate. This is indicted at time≈1.75 s in panel 25 in FIG. 5, where it can be seen that Vs derived from $V_p/V_s$ does not match synthetic model to the same degree as $V_p/V_s$.

Step 3: Inversion of Density from Far Offset (Up to 5 km) Data with $I_P$ and $V_P/V_S$ Fixed from the Previous Two Steps.

Figure 6:
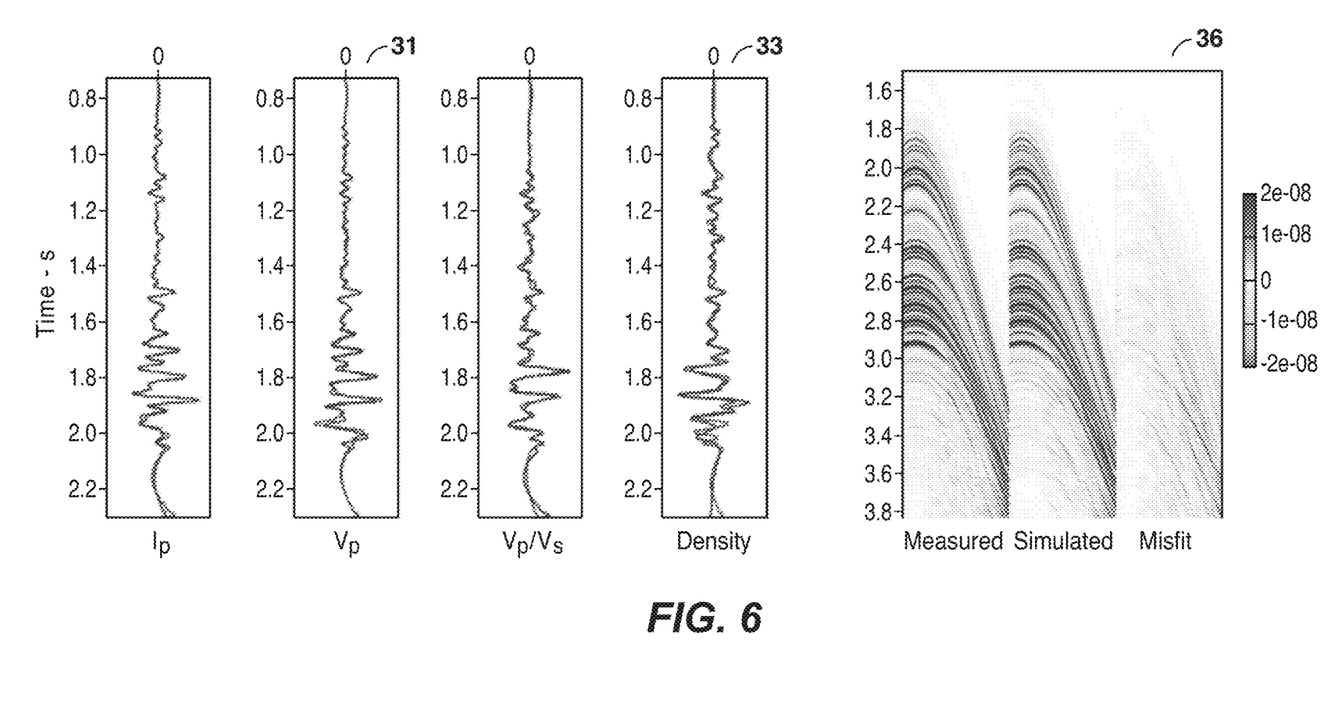
FIG. 6 shows the results of inversion of density from far offset data, with $I_P$ and $V_P/V_S$ fixed from FIG. 2 and FIG. 4.

The mathematical relations (1)-(3) indicate that any update of density with $I_P$ and $V_P/V_S$ being fixed results in an update to $V_P$ and $V_S$. Therefore, inversion of density with $I_P$ and $V_P/V_S$ fixed is equivalent to inversion of $V_P$. In step 3, all available offsets up to 5 km (in this example) are used to perform an elastic inversion for density, with $I_P$ and $V_P/V_S$ fixed from steps 1 and 2. FIG. 6 shows inverted density (dark line, 33) after 10 iterations, overlaid with the synthetic model (lighter shaded line, 33), where the synthetic model is 7 in FIG. 2, converted to time domain. At the same time, step 3 results in an improved prediction of $V_P$ (31, dark line) compared with that of FIG. 3 (10, dark line) due to the updated density profile 33. Data misfit is mostly at far offsets (2 km to 5 km) as is shown at 36 in FIG. 3.

The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined by the appended claims.

REFERENCES

Aki and Richards, *Quantitative Seismology, Theory and Methods*, chapter 5.20, W. H. Freeman & Co. (1980).
Lazaratos, S., Chikichev, I. and Wang, K., 2011, Improving convergence rate of Full Wavefield Inversion (FWI) using spectral shaping, PCT patent application publication WO2012/134621.
Hampson, Russell, and Bankhead, "Simultaneous inversion of pre-stack seismic data," 75th Annual International Meeting, SEG, Expanded Abstracts, 1633-1637 (2005).
Sears, Singh and Barton, "Elastic full waveform inversion of multi-component OBC seismic data," *Geophysical Prospecting* 56, 843-862 (2008)

The invention claimed is:

1. A computer-implemented method for full wavefield inversion of seismic data to infer subsurface physical property parameters including P-wave (pressure wave) velocity, S-wave (shear wave) velocity, and density, comprising:
    extracting only PP mode (P-wave down/P-wave up) from the seismic data, and inverting, with a full wavefield inversion algorithm, the PP mode data sequentially in two or more different offset ranges, each offset range full wavefield inversion determining at least one physical property parameter, wherein in a second and subsequent full wavefield inversions, parameters determined in a previous inversion are held fixed, and further wherein all full wavefield inversions are performed using a computer; and
    generating, with a computer, a subsurface physical property model that includes the P-wave velocity, S-wave velocity, and the density from the full wavefield inversion algorithm, which transforms the seismic data into the subsurface physical property model, wherein the subsurface physical property model is a quantitative rock-property description of a hydrocarbon reservoir, and using the subsurface physical property model for geophysical prospecting.

2. The method of claim 1, wherein a near offset range is sequentially first to be inverted, and said first full wavefield inversion infers P-wave acoustic impedance Ip, using a computer programmed with an acoustic full wavefield inversion algorithm.

3. The method of claim 2, wherein a mid-offset range is sequentially second to be inverted, and said second full wavefield inversion infers S-wave acoustic impedance $I_S$, or P-wave velocity $V_P$ divided by S-wave velocity $V_S$, with $I_P$ fixed at its value from the first full wavefield inversion, said second full wavefield inversion using an elastic inversion algorithm.

4. The method of claim 3, wherein a far-offset range is sequentially third to be inverted and said third full wavefield inversion infers density or $V_P$, using an elastic full wavefield inversion algorithm, with $I_P$ fixed at its value from the first full wavefield inversion and $V_P/V_S$ fixed at a value determined from the second full wavefield inversion.

5. The method of claim 4, wherein $V_P$ and $V_S$ are computed from $I_P$ and $I_S$ using definition of acoustic impedance, and using density as inferred in the third full wavefield inversion.

6. The method of claim 4, wherein $V_P$ is inferred in the third full wavefield inversion, and density is computed from the relationship $I_P = \rho V_P$ and $I_P$ is as determined in the first full wavefield inversion.

7. The method of claim 4, wherein one or both of the relationships $I_P = \rho V_P$ and $I_P = \rho V_s$ are used in performing the method.

8. The method of claim 4, further comprising repeating the sequential full wavefield inversions at least one time to update the inferred physical property parameters.

9. A computer-implemented method for inversion of seismic data to infer at least P-wave (pressure wave) velocity, S-wave (shear wave) velocity, and density, comprising:
(a) taking only PP-mode (P-wave down/P-wave up) data from the seismic data, and dividing the seismic data into a near-offset range, a mid-offset range, and a far offset range, which ranges may or may not overlap;
(b) inverting the near offset range for P-wave acoustic impedance IP, using a computer programmed with an acoustic full wavefield inversion algorithm;
(c) inverting the mid-offset range for S-wave acoustic impedance Is, or for P-wave velocity $V_P$ divided by S-wave velocity $V_S$, with $I_P$ fixed at its value from (b), using an elastic full wavefield inversion algorithm;
(d) inverting the far-offset range for density, using an elastic full wavefield inversion algorithm, with $I_P$ fixed at its value from (b) and $V_P/V_S$ fixed at a value determined from the value of $I_S$ from (c);
(e) computing $V_P$ and $V_S$ from $I_P$ and $I_S$ using definition of acoustic impedance and density as determined in (d); and
(f) generating, with a computer, a subsurface physical property model that includes the P-wave velocity, S-wave velocity, and the density, wherein the steps (b), (c), and (d) transform the seismic data into the subsurface physical property model, wherein the subsurface physical property model is a quantitative rock-property description of a hydrocarbon reservoir, and using the subsurface physical property model for geophysical prospecting.

10. The method of claim 1, wherein at least some of the two or more different offset ranges overlap.

11. The method of claim 1, wherein at least some of the two or more different offset ranges do not overlap.

* * * * *